United States Patent [19]

Johnson

[11] Patent Number: 5,483,633
[45] Date of Patent: Jan. 9, 1996

[54] METHOD AND APPARATUS FOR SURFACING AN OBJECT BASED UPON FORTHCOMING CRITERIA

[75] Inventor: William J. Johnson, Flower Mound, Tex.

[73] Assignee: International Business Machines Corporation, Armonk, N.Y.

[21] Appl. No.: 84,669

[22] Filed: Jun. 29, 1993

[51] Int. Cl.⁶ .................................................. G06F 17/30
[52] U.S. Cl. ........................................... 395/161; 395/155
[58] Field of Search ................................. 395/155, 161, 395/600, 700; 345/117–118

[56] References Cited

U.S. PATENT DOCUMENTS

| | | | |
|---|---|---|---|
| 5,241,656 | 8/1993 | Loucks et al. | 395/158 |
| 5,297,249 | 3/1994 | Bernstein et al. | 395/156 |
| 5,355,497 | 8/1994 | Cohen-Levy | 395/700 |
| 5,388,196 | 2/1995 | Pajak et al. | 395/153 |

OTHER PUBLICATIONS

*Microsoft Access User's Guide*, Microsoft Corporation, 1992 pp. 370, 371.

*Primary Examiner*—Mark R. Powell
*Assistant Examiner*—U. Chauhan
*Attorney, Agent, or Firm*—Geoffrey A. Mantooth

[57] ABSTRACT

A user can specify search criteria which will occur in the future in order to have an object on a data processing system automatically surfaced to a user interface. Once the search criteria is specified, the present invention monitors object for the search criteria. Monitoring occurs by determining when an object changes and then searching the changed object for the search criteria. If the search criteria is found, an identifier is loaded into a queue. The first identifier into the queue causes the object that is associated with the first identifier to become automatically surfaced on the user interface. The user can then surface any other objects that are identified in the queue, or can return to the object that was presented on the user interface just prior to the automatic surfacing.

14 Claims, 11 Drawing Sheets

```
C:\MYDIR\>CODEVIEW ASYNCTST
C:\MYDIR\>
C:\MYDIR\>TYPE TESTDAT.FIL
        •
        •
        •
034572FE4AB67854FFFFFA
C:\MYDIR\>
C:\MYDIR\>
```

METHOD AND APPARATUS FOR SURFACING AN OBJECT BASED UPON FORTHCOMING CRITERIA

TECHNICAL FIELD OF THE INVENTION

The present invention relates in general to data processing systems, and in particular to methods and apparatuses for allowing users to navigate among objects on a user interface of a data processing system.

BACKGROUND OF THE INVENTION

A data processing system object, such as an application program, may be presented to a user as full screen session, a window or an icon on a user interface such as a computer screen. The computer screen may contain plural objects. A user interacts with a particular object through a window or a full screen session displayed on the computer screen.

A window typically occupies only a portion of the computer screen. Thus, the user may be able to see other windows or icons. The window which is currently selected by the user for active input is known as the window having focus. The focused window is surfaced to the user by being displayed in the foreground. The focused window may conceal, either partially or wholly, other windows or icons located on the desktop or user interface.

If the object is represented as a full screen session, the object conceals all other objects located on the user interface. The object with a full screen session is brought into focus by presenting the full screen session.

One problem with having plural objects located on a user interface is the difficulty of navigating among the objects by bringing into focus a desired object. This navigational problem becomes more complicated the more cluttered with objects that the user interface becomes.

In the prior art, there are techniques for allowing users to navigate among windows. One prior art technique, which is referred to as an implicit focus model, automatically changes focus to that window where the cursor or pointer resides. Another prior art technique which is referred to as an explicit focus model, requires locating the cursor or pointer on the window to be brought into focus, as well as an explicit focusing command. In another type of explicit focus model, the user can navigate through a window queue using keyboard commands.

Still another prior art technique is referred as a contextual navigation mechanism. The contextual navigation mechanism allows a user to change the focus of the screen based upon the current content of an object.

There is a problem of navigating among objects with current art techniques in multitasking data processing systems. In multitasking systems, plural objects appear to the user to be executing simultaneously. Thus, a user can access a first object through a first window, start executing the first object, bring a second window for a second object into focus, and interact with the second object while the first object is still being executed by the data processing system. With current art, if the user wishes to monitor the progress of the execution of the first object, the user must periodically navigate back to the first window of the first object. This can be a time consuming and tedious process.

What is needed is a method and apparatus that will automatically navigate to the specified window when some predetermined event occurs in the future.

SUMMARY OF THE INVENTION

It is an object of the present invention to provide a method and apparatus that will automatically surface an object to a user when a predetermined event occurs in the future.

The method and apparatus of the present invention automatically surfaces on a user interface one of plural objects that are located on a data processing system. Search criteria are provided. It is then determined when the search criteria becomes present in an object on the data processing system. When the search criteria becomes present, a target object is surfaced on the user interface.

In one aspect of the present invention, the determination of when the search criteria becomes present in an object further includes detecting changes in the objects located on the data processing system and searching the changed objects for the search criteria.

In still another aspect of the present invention, the target object that is surfaced is the same object that has the determined search criteria. In still another aspect of the present invention, the target object that is surfaced is an object that is specified by a user.

In still another aspect, after the target object is surfaced, a current object can be surfaced on the user interface. The current object was the object that was surfaced on the user interface just prior to the surfacing of the target object.

The present invention allows a user to automatically navigate to some desired object at some time in the future. The user need only provide search criteria. After providing the search criteria, the user may take up another task. While the user is working or doing some other task, the present invention automatically waits for the forthcoming search criteria. When the search criteria occurs in an object, the object is automatically surfaced to the user on the user interface. The user can easily return to the current object, which is the object that the user was interacting with just prior to the surfacing of the target object. The user can also determine if there are other target objects that have the search criteria therein. These other target objects can be surfaced.

BRIEF DESCRIPTION OF THE DRAWINGS

FIGS. 10a–14 are flow charts showing the method of the present invention, in accordance with a preferred embodiment.

FIGS. 10a and 10b show a flow chart that allows the user to set up search criteria and that surfaces an object when the search criteria occurs.

FIG. 11 shows a flow chart that searches for the search criteria whenever an object on the data processing system changes.

FIG. 12 is a flow chart that allows a user to return to the previous object, after the surfacing of a surfaced object.

FIG. 13 is a flow chart that allows a user to branch to another object that has the search criteria.

FIG. 14 is a flow chart that allows a user to end searching for search criteria.

DETAILED DESCRIPTION OF THE INVENTION

Figure 1:
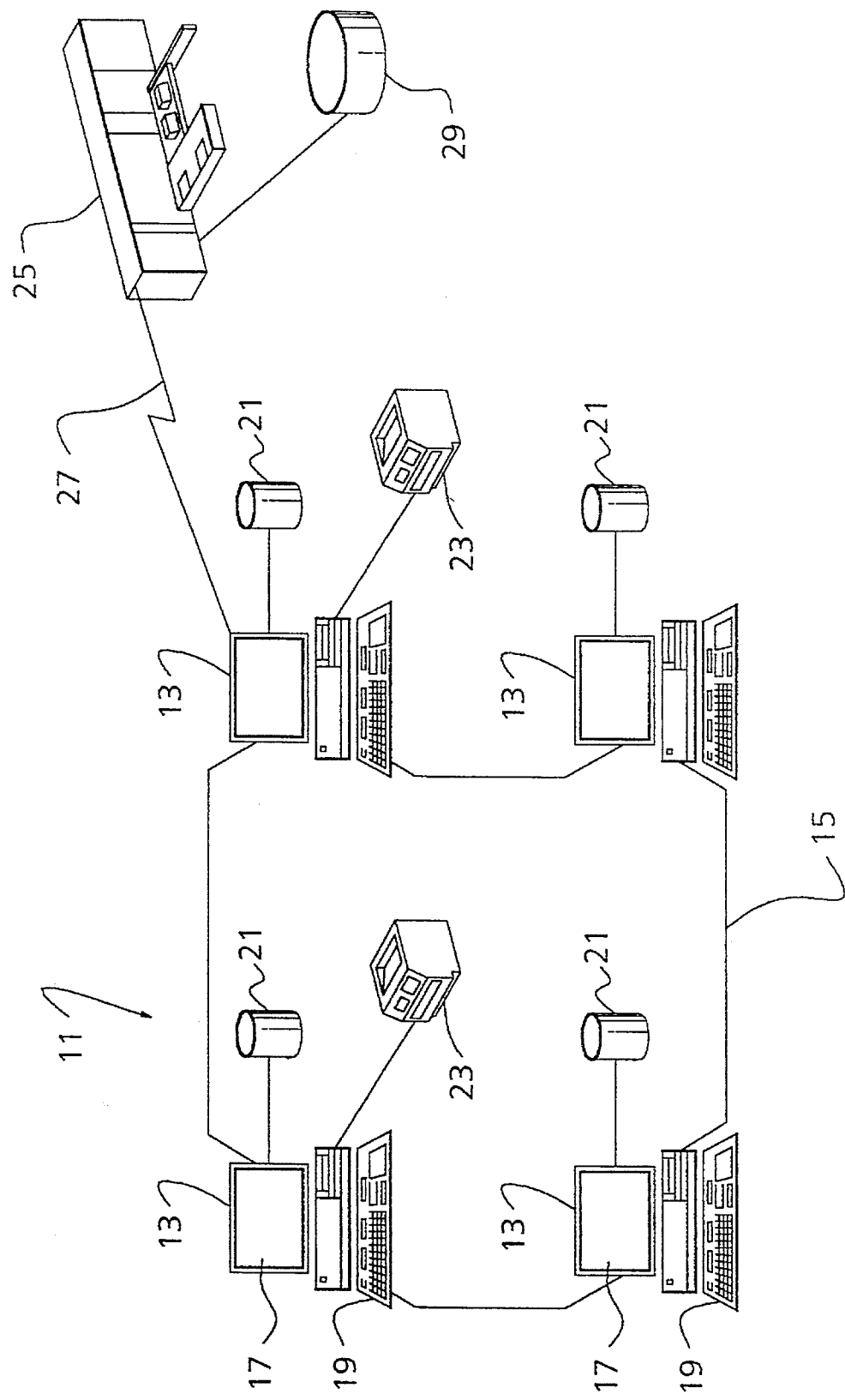
FIG. 1 is a schematic view of a data processing system on which the present invention can be practiced.

In FIG. 1, there is shown a schematic diagram of a data processing system 11, upon which the present invention can be practiced. The data processing system 11 includes plural individual computers 13 which are connected together in a local area network (LAN) 15. Each workstation 13 includes a user interface, which has a display screen 17 and a keyboard 19. Each computer 13 may also be coupled to a storage device 21 and to a printer or output device 23. One or more of such storage devices 21 may be utilized, in accordance with the present invention, to store applications or resource objects which may be periodically accessed by any user within the data processing system 11.

The data processing system 11 may also include a mainframe or host computer 25 that is coupled to one of the workstations by a communication link 27. The host computer 25 may also be coupled to a storage device 29 which may serve as a remote storage for the computers.

The present invention allows a user to specify a search criteria which is anticipated to occur sometime in the future. Once specified, the user can work on another, unrelated task or tasks by interacting with one or more other objects. While the user is busy interacting with other objects, the present invention monitors all of the objects on the data processing system. Whenever an object changes, the present invention determines if the changed object contains the search criteria. If not, then the present invention continues to monitor changed objects for the search criteria. If the changed object does contain the search criteria, then that object is immediately surfaced on the user interface by transposing the object with the object that was in focus. Thus, the object having the occurrence of the search criteria is brought into focus for the user.

Figures 2, 3:
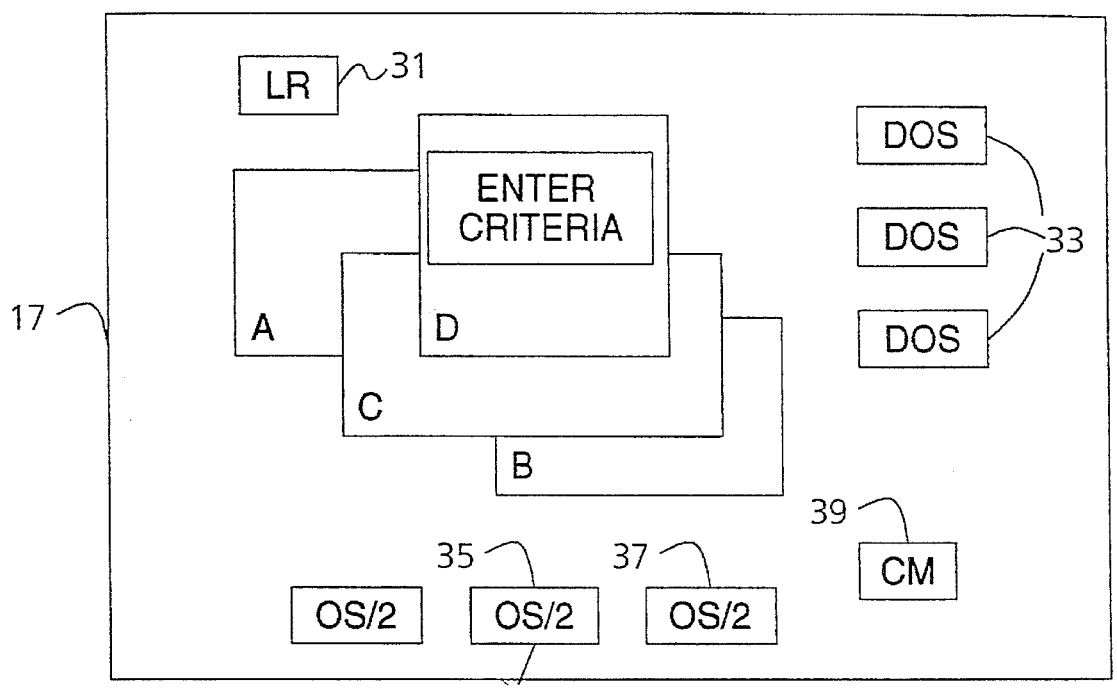
FIGS. 2–5 are schematic representations of a computer screen, which representations illustrate a first example of the present invention.

Referring to FIGS. 2–5, an example will be described. In FIG. 2, there is shown a schematic representation of a computer screen 17. The screen 17 contains plural objects. Some objects are represented as windows or panels. These are windows A, B, C and D. Window D overlaps windows A, B and C. Other objects are represented as icons. There is a LAN requestor icon 31, plural disk operating system (DOS™) icons 33, plural operating system (OS/2™) icons 35, 37 and a communications manager icon 39. Still other objects may be hidden behind the windows.

Suppose the user wishes to perform a code development operation called MAKE and to monitor its status. There is provided a window, labeled as "Enter Criteria" in FIG. 2. The user enters the search criteria of "MAKE COMPLETE" into the "Enter Criteria" window. The user knows that the message "MAKE COMPLETE" will appear when the execution of the MAKE program is finished, hence the reason for specifying this textual string as the search criteria. Then, the user selects an OS/2 icon 35 to begin the code development MAKE operation. This action brings up the full screen session of FIG. 3, wherein the user enters the command parameters needed to execute the MAKE program on the computer.

Figure 4:
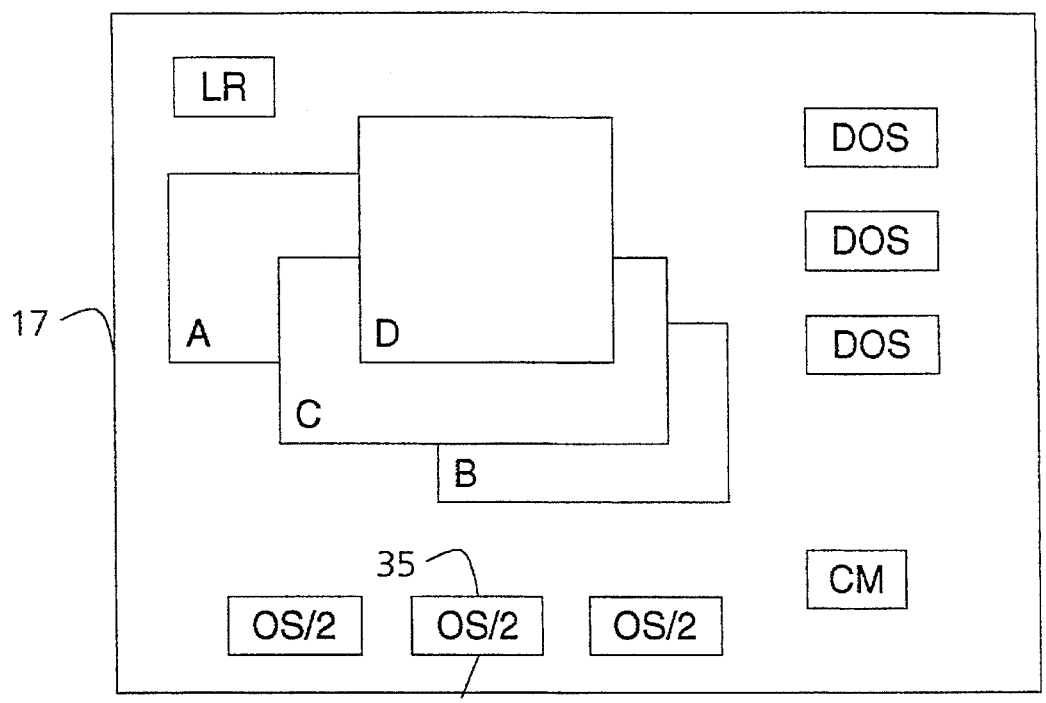
Figure 5:
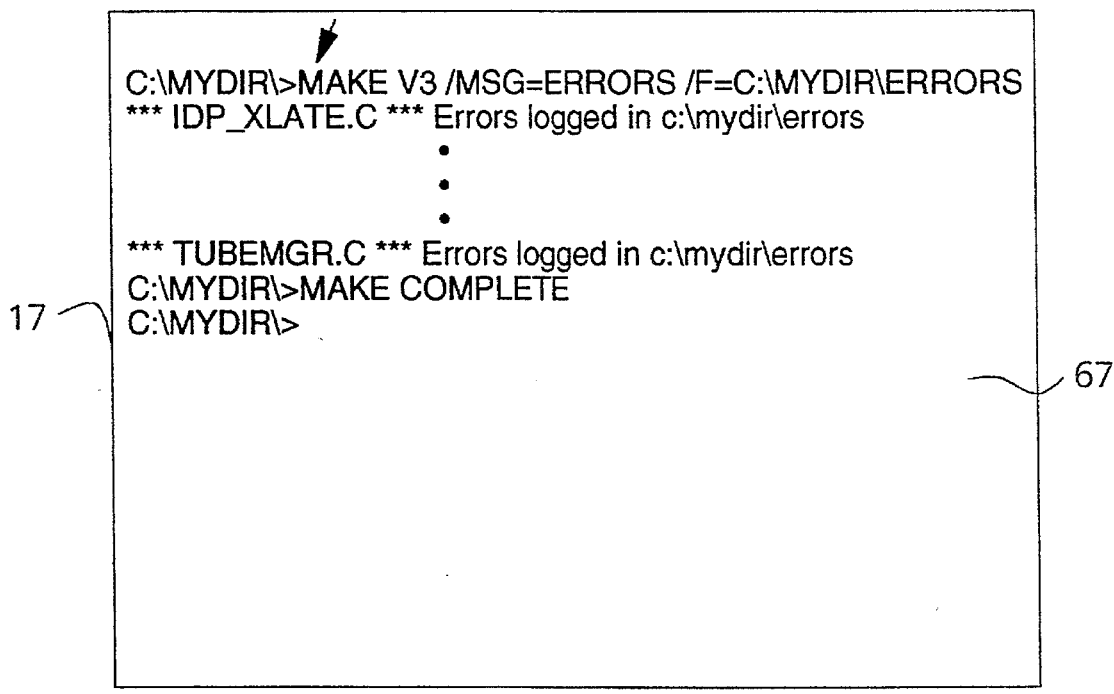

After causing the MAKE program to execute, the user focuses the window D, wherein the screen of FIG. 4 is displayed, and begins interacting with the window. At some time in the future, the MAKE program finishes executing and produces the string "MAKE COMPLETE". When this occurs, the full screen session is automatically and immediately surfaced on the screen 17, as shown in FIG. 5, thereby presenting the object 35 to the user. The user can verify that the MAKE program has completed and can check on various parameters to determine the quality of the execution of the program. Then, the user can return to window D by using a well known keystroke or other type of user input.

Thus, with the present invention, once the user has initiated a search for search criteria, the user need not navigate back to the MAKE object 35 to check on its status. The present invention automatically navigates to the object upon the occurrence of the search criteria.

The object containing the search criteria need not itself be surfaced, but may instead serve as a trigger to surface another object. FIGS. 6–9 illustrate this aspect of the present invention by a second example.

Figure 6:
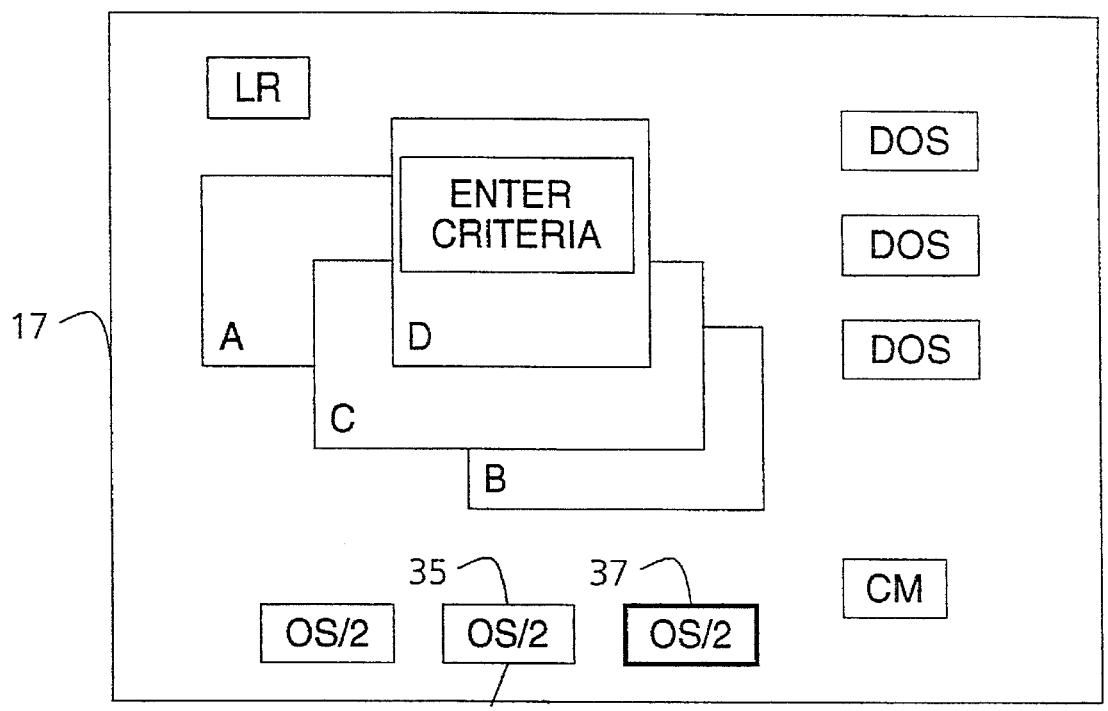
FIGS. 6–9 are schematic representations of a computer screen, which representations illustrate a second example of the present invention.
Figure 7:
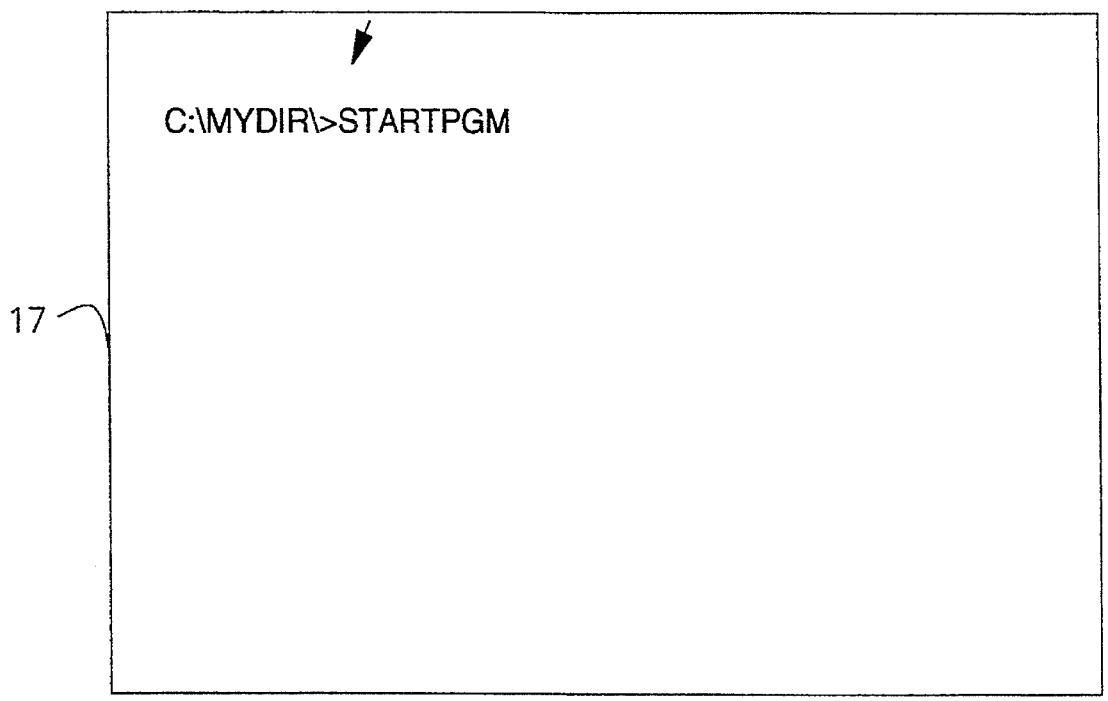

Referring to FIG. 6, the user focuses the "Enter Criteria" window and enters the search criteria of "Initialization Finished" for a first OS/2 object 35 and selects a second OS/2 object 37 (shown highlighted in FIG. 6) to be surfaced. The search criteria of "Initialization Finished" is a progress indicator of a program STARTPGM, which is to be executed by the first OS/2 object 35. The progress indicator allows the user to debug the program while all necessary executable counterparts are brought up in the system. Thus, the search criteria need not be a program's termination. The second OS/2 object 37 is an asynchronous program that is related to STARTPGM.

The user selects the first OS/2 session 35 (FIG. 7) and begins executing STARTPGM. The user then brings window D (FIG. 8) into focus to perform various tasks.

Figures 8, 9:
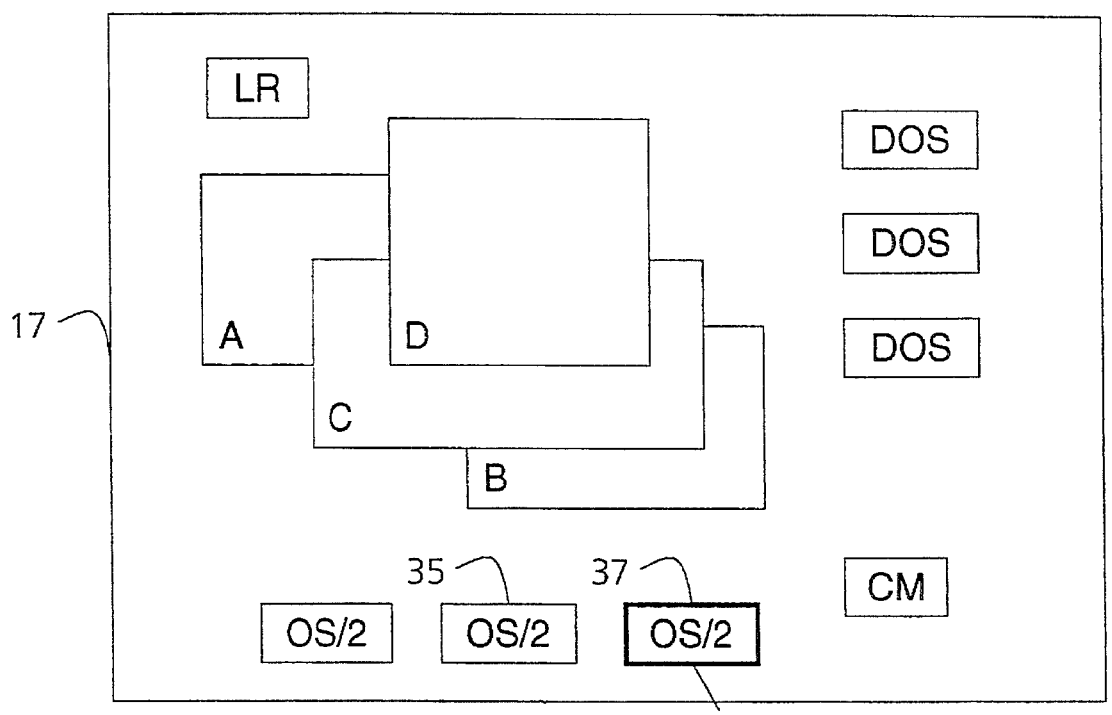

When the search criteria is detected in the first OS/2 session 35, the second OS/2 object 37 (instead of the first OS/2 object 35) is surfaced as a full screen session, as shown in FIG. 9. The user can now debug the asynchronous program in the second OS/2 object 37. The user did not want to start the debugging of this asynchronous program until STARTPGM progressed to a desired point in its execution. The present invention saved the user from having to use conventional navigation techniques to poll or otherwise check on the status of STARTPGM.

Referring now to FIGS. 10a–14 the method of the present invention will be described. In the flow charts, the following graphical conventions are observed: a rectangle for either a process, function or screen display, a diamond for a decision and a pentagon or circle for a connector in exiting to or entering from another part of the flow chart. These conventions are well understood by programmers skilled in the art of user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages.

Figure 10A:
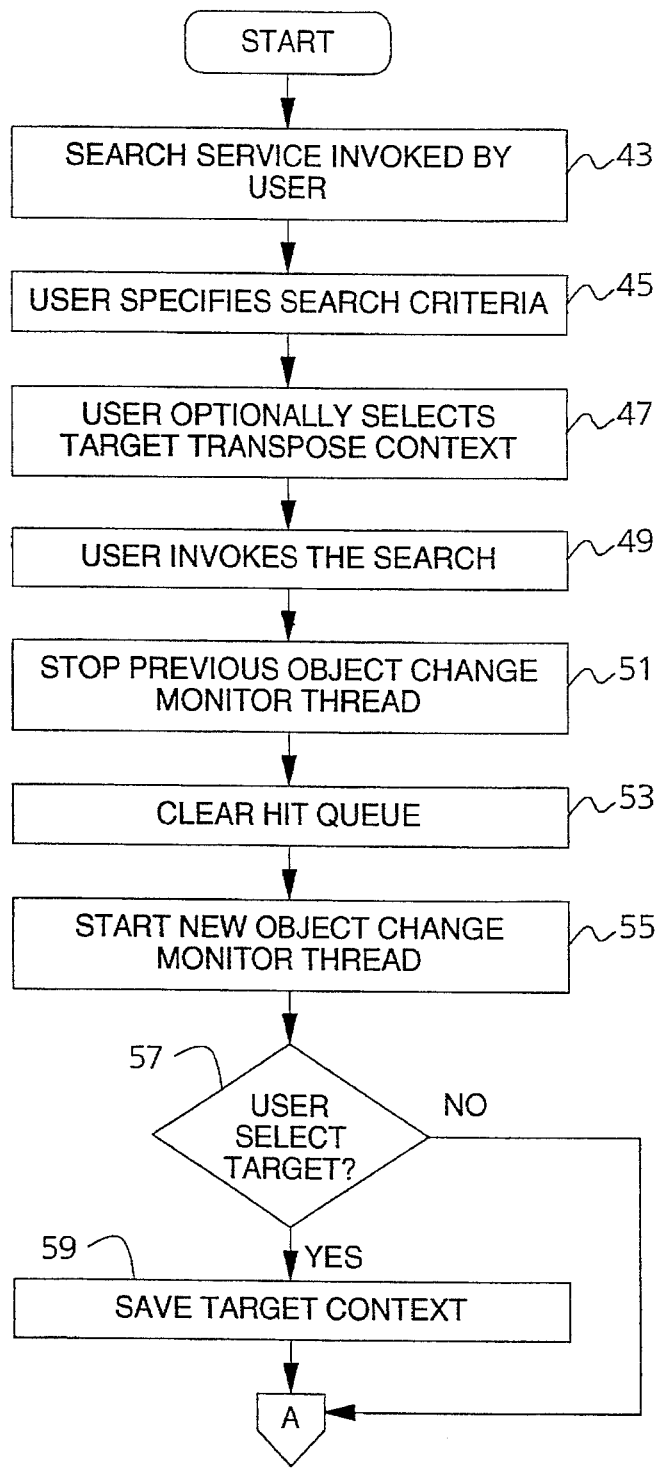
Figure 11:
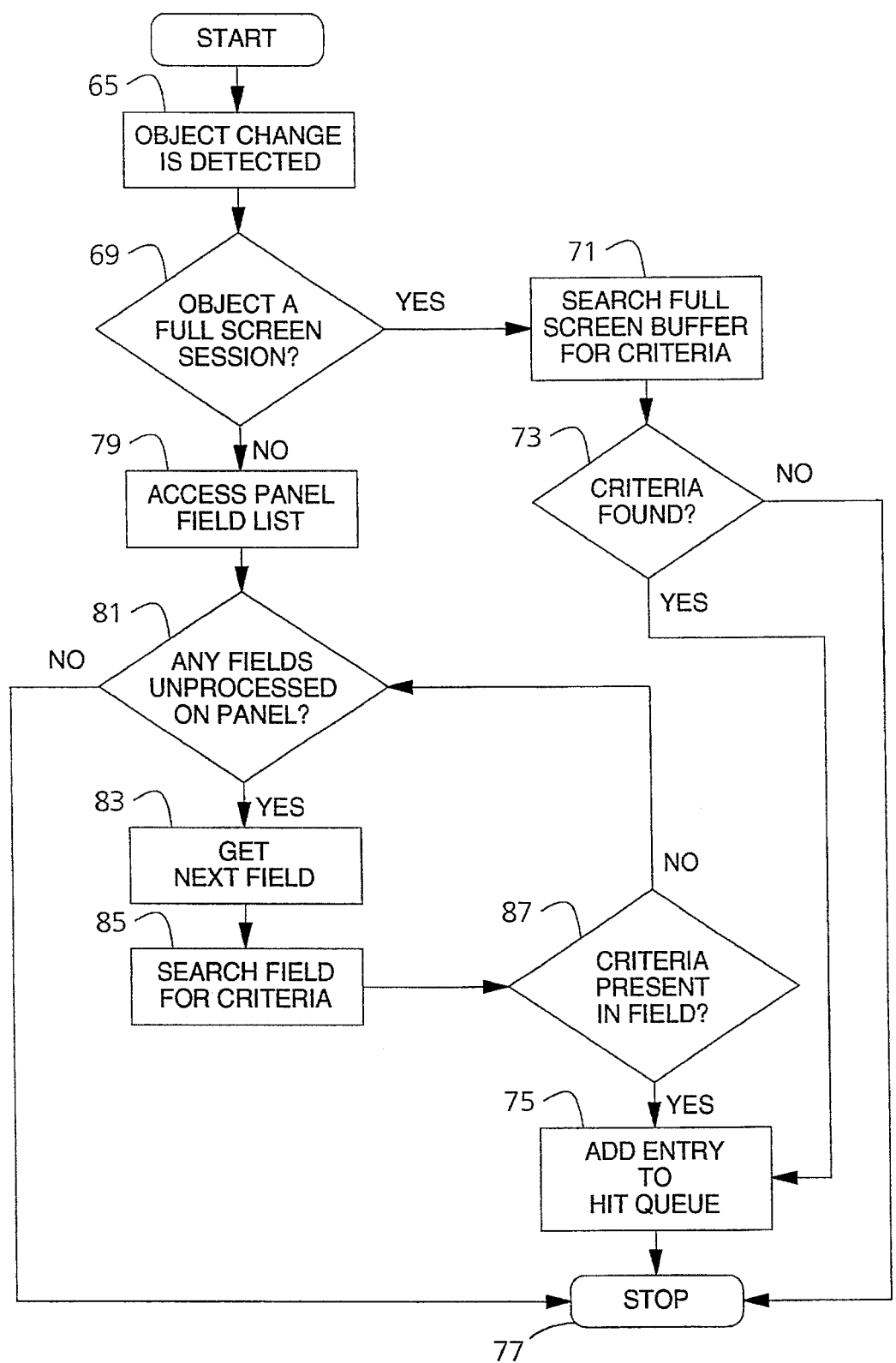

The flow charts will first be described in general, followed by a more specific description with reference to the individual steps. In general, the method of FIG. 10a allows a user to specify both a search criteria and the object which is to be surfaced when the specified search criteria is detected. Once specified, then the method starts a monitor thread. The monitor thread is shown in FIG. 11 and is executed each time an object on the data processing system is changed in a detectable manner. When an object change is detected, the changed object is searched for the specified search criteria. If the search criteria is found, then a handle (or other identifier) associated with the object is loaded into a hit queue.

Figure 10B:
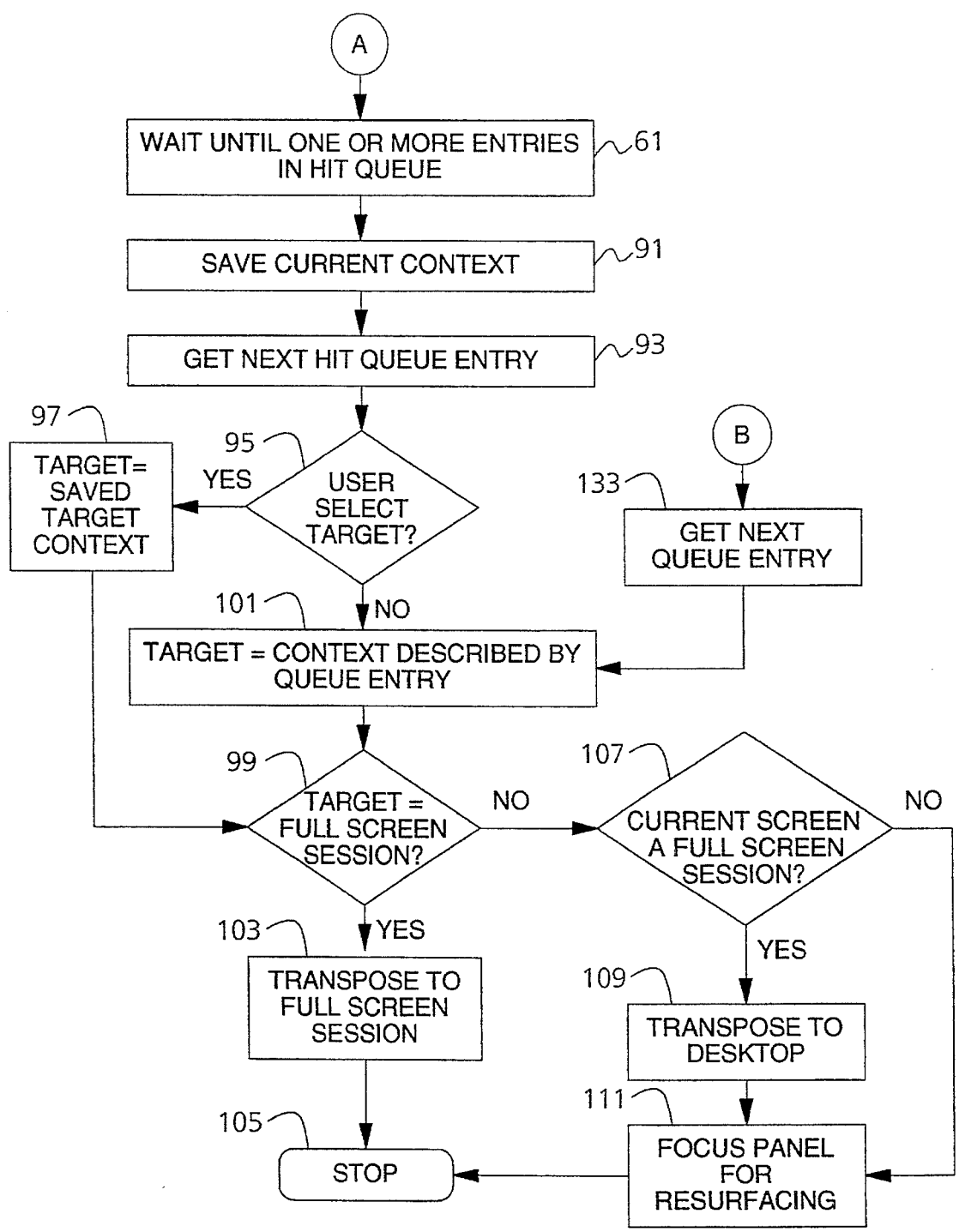

The hit queue is monitored by the method of FIG. 10b. Thus, when an object handle is loaded into the hit queue, the specified object is transposed to either a full screen session or to a focused window or panel. In this manner, the specified object is surfaced to the user. The user can then interact with the transposed object.

Figure 12:
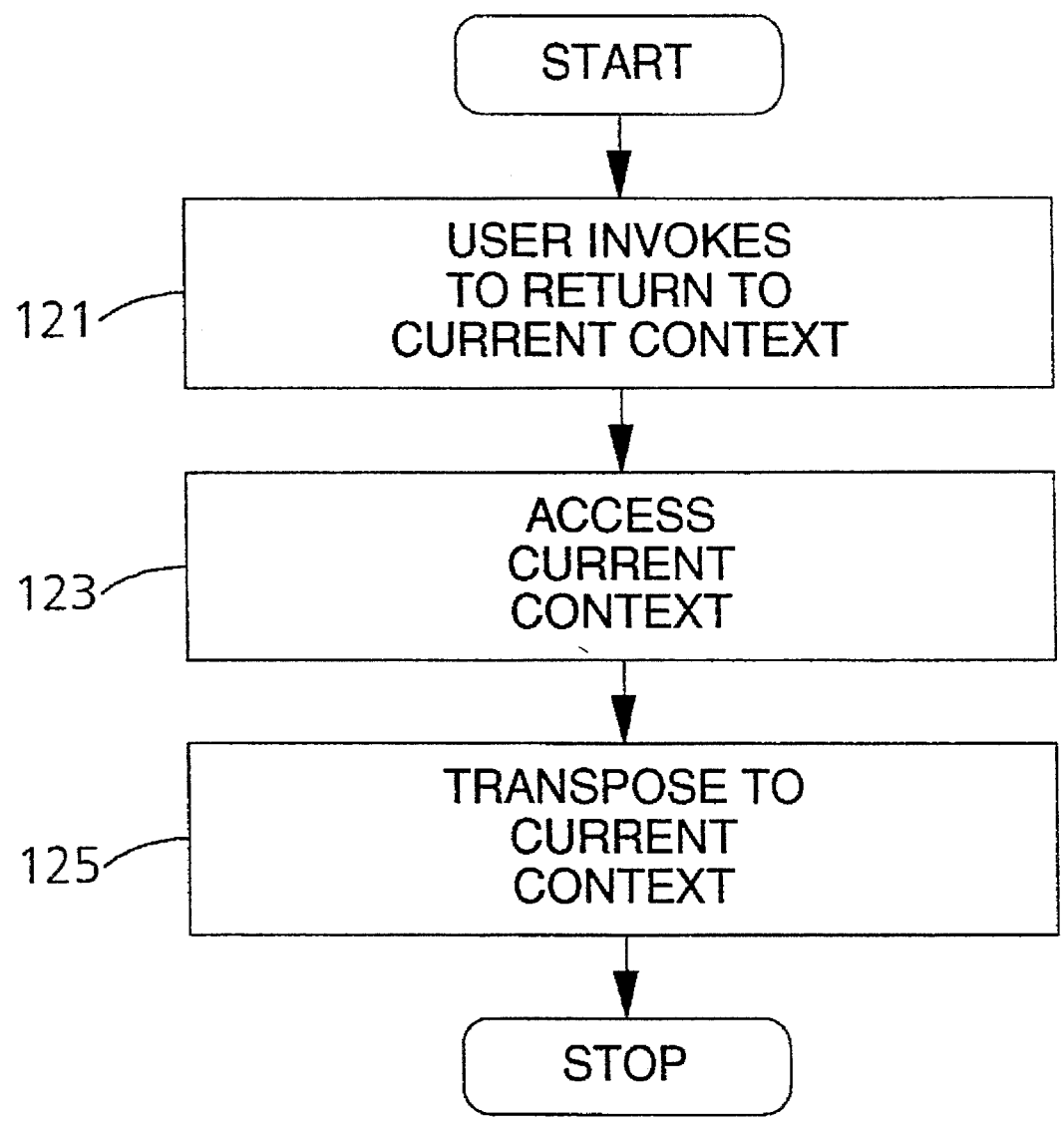

When the user is through interacting with the transposed object, the user can return to the object that the user was interacting with just prior to the transposition, using the method of FIG. 12. Alternatively, using the method of FIG. 13, the user can branch to another object having the same, or another, detected search criteria. This other object has a handle stored in the hit queue. The actual transposition of the other object occurs with the method of FIG. 10b.

Figure 14:
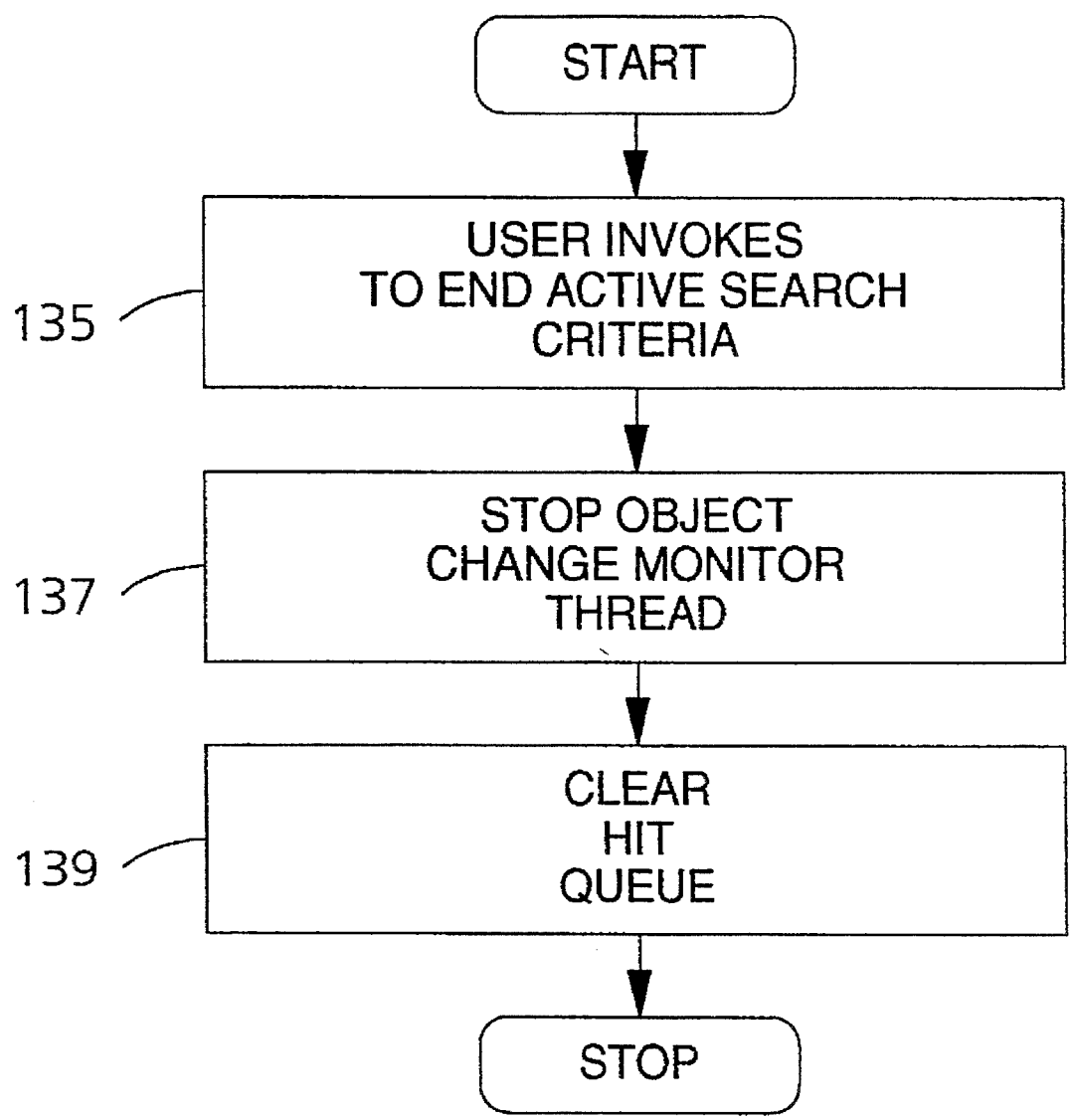

Finally, the user can end the search for search criteria with the method of FIG. 14.

Now the flow charts will be described more specifically. Referring to FIG. 10a, the user invokes the present invention, step 43, by pressing a well known key on the keyboard 19 (FIG. 1), by using the mouse cursor to select an object embodying the present invention, or by providing a voice input. The user interface for the present invention object (as embodied by the flow charts) is displayed on the screen. The user interface can be the window "Enter Criteria" shown in FIGS. 2 and 6, wherein the window is brought into focus. The user specifies the search criteria, step 45. Keyboard or voice input is permitted for the specification of the search criteria. Other multimedia inputs are also permitted to specify the search criteria. The search criteria may be textual strings or detectable object events. The search criteria may include logical operators, such as "STRING1" AND "STRING2". In step 47, the user may select the target transpose context by specifying the object which is to be surfaced upon the occurrence of the search criteria. The target transpose context has a default value which is the same as the object containing the search criteria. The first example of FIGS. 2–4 illustrates a situation where the surfaced object contained the search criteria. The second example of FIGS. 5–9 illustrates a situation where the surfaced object does not contain the search criteria but is surfaced because another object does contain the search criteria. Note that the user need not specify the object containing the search criteria. This is because the present invention searches all of the objects on the data processing system for the search criteria.

In step 49, the user invokes the search by pressing the ENTER key on the keyboard 19. In step 51, any ongoing search for previously specified search criteria is stopped by stopping any previous object change monitor thread or threads (the object change monitor thread will be described in more detail hereinafter).

The method utilizes a hit queue, which is contained in memory, for storing plural occurrences of the search criteria. The hit queue is a first-in first-out queue. In step 53, the hit queue is cleared, so as to be unaffected by any previous search.

In step 55, a new object change monitor thread (or threads if more than one search criteria is specified) is started. The new object change monitor thread utilizes the search criteria that was entered in step 45.

In step 57, the method determines if the user has selected a target in step 47. If YES, then the method saves the target context, step 59. The target context is the window or full screen session provided by the target object to the user. Referring to the second example discussed previously, the target context is shown in FIG. 9. If the result of step 57 in FIG. 10a is NO, then the method bypasses step 59 and proceeds to step 61, FIG. 10b. Likewise, after step 59, the method proceeds to step 61.

In step 61, the method waits until the hit queue has one or more entries therein.

Entries are added to the hit queue by the method of FIG. 11. The method of FIG. 11 is a thread in the user's computer 13 that is started in step 55 of FIG. 10a. The FIG. 11 thread is executed whenever an object on the computer 13 is changed, step 65. An object changes when either the user or the object itself provides data to be located in the client area of the object's user interface. For example, referring to FIG. 5, when the string "MAKE COMPLETE" is put into the memory for the client area 67 of the full screen session, then the object is changed and thread of FIG. 11 executes.

In step 69, it is determined if the object is represented as a full screen session such as is shown in FIG. 5. If YES, then the full screen buffer is searched for the specified search criteria, step 71. In step 73, it is determined if the search in step 71 has found the search criteria. If YES, then an entry is added to the hit queue. The entry contains a unique handle or identification for the object to enable the object to be surfaced by the method of FIG. 10b. The handle can include the title bar text from the object's window. After step 75, the thread stops, step 77. If the result of step 73 is NO, then the thread stops, step 77.

If the result of step 69 is NO, the object is not a full screen session, but is instead a window or panel, then the thread accesses the panel field list for the object that has been changed, step 79. A field by field search is then conducted for the search criteria. In step 81, it is determined if there are any fields that are unprocessed on the panel or window. The result of step 81 is NO if the window is blank with no fields, or if all of the fields have been processed by steps 83–87. If the result of step 81 is NO, then the thread stops, step 77.

If the result of step 81 is YES, then the thread gets the next (or first) field, step 83. In step 85, the field is searched for the specified search criteria. In step 87, it is determined if the search criteria is present in the field based upon the results of step 85. If YES, then the entry for the object is added to the hit queue, step 75. If NO, then the thread returns to step 81 to determine if there are any unprocessed fields on the panel.

If the result of step 87 is YES, there is no need to process further fields because the object will be surfaced irregardless of whether other fields in the same object contain the specified search criteria.

Once an entry has been put into the hit queue, the method of FIG. 10b continues on from step 61. In step 91, the current context is saved. The current context is the window or full screen session provided by the object being used by the user just prior to the transposition. Referring to the first and second examples discussed above, the current context is window D, as shown in FIGS. 4 and 8. In step 93, the method gets the next (or first) hit queue entry. In step 95, the method determines if the user has selected a target. If YES, then the target object is set to the saved target context from step 59 of FIG. 10a, step 97. The method then proceeds to step 99. If the result of step 95 is NO, then the target is set to the context described by the hit queue entry, step 101. The method then proceeds to step 99.

In step 99, the method determines if the target is a full screen session. If YES, then the method transposes to the target object's full screen session, step 103. Referring to the first example described above, the target object's full screen session is shown in FIG. 5. Referring to the second example described above, the target object's full screen session is shown in FIG. 9. The method then stops, step 105.

If the result of step 99 is NO, then the method determines if the current screen (for example the screen of FIG. 4) is a full screen session, step 107. If the result of step 107 is NO, as in FIG. 4, then the target panel or window is focused for resurfacing, step 111. An example of this would be if, referring to FIG. 4, a transposition occurred from current window D to target window B. Window B would be surfaced and window D could be concealed, either wholly or partially, from view. After step 111, the method stops, step 105.

If the result of step 107 is YES, the current screen is a full screen session, then the method transposes to the desktop containing the target window, step 109, and the target panel or window is focused, step 111. An example of this would be if a transposition occurred from the full screen session of FIG. 5 to window B. Step 109 would cause the desktop of FIG. 4 to be displayed. Then step 111 would bring window B into focus.

Once the target object has been transposed to a surfaced presentation, then the user can interact with the target object. After the user has interacted with the target object, the user can, with the method of FIG. 12, return to the current object with which the user was interacting with just prior to the surfacing of the target object. The user invokes the method of FIG. 12 using a well known key or other input, step 121. In step 123, the current context is accessed. The current context was saved in step 91 of FIG. 10*b*, before the target object was surfaced. In step 125 of FIG. 12, the method transposes to the current context, wherein the current context is surfaced.

To illustrate the method of FIG. 12, reference is made to FIGS. 4 and 5. Suppose that the target object of FIG. 5 has automatically surfaced because of the occurrence of "MAKE COMPLETE". The user is now finished interacting with the full screen session of FIG. 5 and wishes to return to window D of FIG. 4. Window D is the object with which the user was interacting just before the full screen session of FIG. 5 automatically surfaced. To return to window D, the user presses a well known key to invoke the method of FIG. 12. Step 123 accesses window D and step 125 returns the display to window D as shown in FIG. 4. Not only is window D surfaced on the computer screen 17, but its context is displayed as well. That is, window D is one of many objects on a desktop. The desktop, with all of its objects, is displayed with window D being surfaced on the desktop. If the current context had been a full screen session, then the full screen session would have surfaced.

As an alternative to returning to the current context, the user can branch to other objects that contain either the same or other specified search criteria. The thread of FIG. 11 is executed each time an object change is detected. Thus, object changes occurring subsequent to the surfacing of a target object are searched for the specified search criteria. If the search criteria is found in a subsequent object change, then the object entry is added to the hit queue, step 75 of FIG. 11, but no automatic transposition of the target object occurs. This is because the method of FIG. 10*b* is stopped after surfacing the first object entry in the hit queue. Alternatively, the user may have provided several object change monitor threads, with each thread searching for different search criteria. Entries for objects found by these other threads are added to the hit queue.

Figure 13:
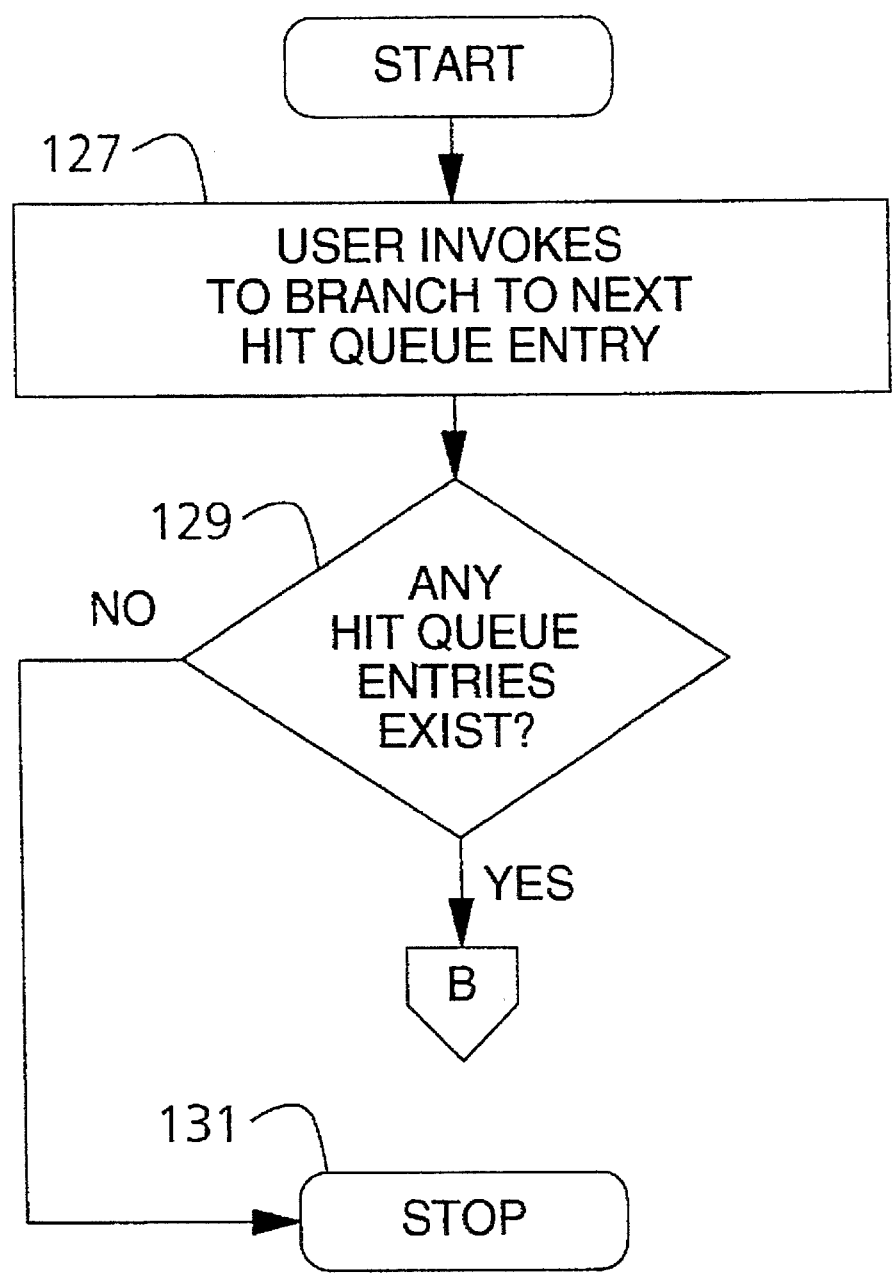

The user can branch to other entries in the hit queue with the method of FIG. 13. In step 127, the user invokes the method using a well known key or other input. In step 129, the method determines if there are any entries in the hit queue. If NO, then the hit queue is empty and the method stops, step 131. If YES, then the method proceeds to step 133 of FIG. 10*b* to get the next hit queue entry. After step 133, the target is set to the context described by the hit queue entry, step 101, and in subsequent steps the target object is transposed so as to become surfaced.

The user can at any time stop the search for search criteria and the resulting possibility of an automatic transposition. The method of FIG. 14 is invoked by the user hitting a well known key or providing some other input, step 135. In step 137, the object change monitor thread (or threads) is stopped. In step 139, the hit queue is cleared. Thus, the execution of the present invention is ended.

Although the present invention has been described as being executed on a single computer, monitoring for the search criteria can occur on a remote computer. For example, referring to FIG. 1, a user at one of the computers 13 can use the present invention to monitor for search criteria present in objects on other computers in the LAN 15 or on the mainframe computer 25. Thus, the monitor thread of FIG. 11 would be executed every time an object change occurs on the LAN 15 or on the mainframe computer 25.

The foregoing disclosure and the showings made in the drawings are merely illustrative of the principles of this invention and are not to be interpreted in a limiting sense.

What I claim is:

1. A method of automatically surfacing on a user interface one of plural objects located on a data processing system, comprising the steps of:
   a) providing a search criteria;
   b) providing a target object that is to be surfaced;
   c) determining when said search criteria becomes present in one of said plural objects on said data processing system; and
   d) surfacing said target object on said user interface when said search criteria becomes present.

2. The method of claim 1 wherein said step of determining when said search criteria becomes present in one of said plural objects on said data processing system further comprises the steps of:
   a) detecting changes in said objects located on said data processing system; and
   b) searching said objects having said detected changes for said search criteria.

3. The method of claim 1 wherein said step of surfacing said target object on said user interface if said search criteria becomes present further comprises the step of surfacing an object that is specified by a user, said object that is specified by a user being specified by a user input that is independent of said search criteria.

4. The method of claim 1 wherein said step of surfacing said target object on said user interface if said search criteria becomes present further comprises the step of surfacing said object having said determined search criteria.

5. The method of claim 1 further comprising the steps of, after said step of surfacing said target object on said user interface if said search criteria becomes present, accepting a user input for resurfacing a current object to said user interface, said current object having been surfaced on said user interface just prior to said step of surfacing said target object, and, upon accepting said user input for resurfacing a current object, resurfacing said current object to said user interface.

6. The method of claim 1 further comprising the steps of:
   a) after said step of determining when said search criteria becomes present in one of said plural objects, determining if said search criteria becomes present in an other object on said data processing system; and
   b) after said step of surfacing said target object on said user interface if said search criteria becomes present, surfacing said other object on said user interface if said search criteria has become present in said other object.

7. The method of claim 1, wherein said step of determining when said search criteria becomes present in one of said plural objects on said data processing system further comprises the step of waiting for said search criteria to become present in an object.

8. An apparatus for automatically surfacing on a user interface one of plural objects located on a data processing system, comprising:
   a) means for providing a search criteria;
   b) means for providing a target object that is to be surfaced;
   c) means for determining when said search criteria becomes present in one of said plural objects on said data processing system; and
   d) means for surfacing said target object on said user interface when said search criteria becomes present.

9. The apparatus of claim 8 wherein said means for determining when said search criteria becomes present in one of said plural objects on said data processing system further comprises:
   a) means for detecting changes in said objects located on said data processing system; and
   b) means for searching said objects having said detected changes for said search criteria.

10. The apparatus of claim 8 wherein said means for surfacing said target object on said user interface if said search criteria becomes present further comprises means for surfacing an object that is specified by a user, said object that is specified by a user being specified by a user input that is independent of said search criteria.

11. The apparatus of claim 8 wherein said means for surfacing said target object on said user interface if said search criteria becomes present further comprises means for surfacing said object having said determined search criteria.

12. The method of claim 8 further comprising means for accepting a user input for resurfacing a current object to said user interface after said target object has been surfaced, said current object having been surfaced on said user interface just prior to the surfacing of said target object, and means for resurfacing said current object to said user interface upon accepting said user input for resurfacing a current object.

13. The apparatus of claim 8 further comprising:
   a) means for determining if said search criteria has become present in an other object on said data processing system; and
   b) means for surfacing said other object on said user interface if said search criteria has become present in said other object and after said target object has been surfaced.

14. The apparatus of claim 8 wherein said means for determining when said search criteria becomes present in one of said plural objects on said data processing system further comprises means for waiting for said search criteria to become present in an object.

* * * * *